United States Patent
Chung et al.

(10) Patent No.: US 8,898,648 B2
(45) Date of Patent: Nov. 25, 2014

(54) METHODOLOGY FOR FAST DETECTION OF FALSE SHARING IN THREADED SCIENTIFIC CODES

(71) Applicant: International Business Machines Corporation, Armonk, NY (US)

(72) Inventors: I-Hsin Chung, Chappaqua, NY (US); Guojing Cong, Ossining, NY (US); Hiroki Murata, Tokyo (JP); Yasushi Negishi, Tokyo (JP); Hui-Fang Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/689,927

(22) Filed: Nov. 30, 2012

(65) Prior Publication Data

US 2014/0156939 A1    Jun. 5, 2014

(51) Int. Cl.
*G06F 15/00* (2006.01)
*G06F 15/76* (2006.01)
*G06F 11/00* (2006.01)
*G06F 9/44* (2006.01)
*G06F 9/45* (2006.01)

(52) U.S. Cl.
USPC ............... 717/131; 712/12; 714/45; 717/128; 717/148; 717/149; 717/158; 717/159; 717/161

(58) Field of Classification Search
CPC ......... G06F 8/314; G06F 8/445; G06F 8/456; G06F 11/30; G06F 11/3447; G06F 11/3466; G06F 11/3644; G06F 12/0802; G06F 12/0837; G06F 9/3836; G06F 9/30145; G06F 9/45516
See application file for complete search history.

(56) References Cited

U.S. PATENT DOCUMENTS

| | | | |
|---|---|---|---|
| 5,761,729 A | 6/1998 | Scales | |
| 6,757,891 B1 * | 6/2004 | Azagury et al. | ............... 717/158 |
| 7,114,036 B2 | 9/2006 | DeWitt et al. | |

(Continued)

OTHER PUBLICATIONS

Tor E. Jeremiassen et al., Reducing false sharing on shared memory multiprocessors through compile time data transformations, Aug. 1995, [Retrieved on Jan. 14, 2014]. Retrieved from the internet: <URL: http://dl.acm.org/citation.cfm?id=209955> 10 Pages (179-188).*

(Continued)

*Primary Examiner* — Don Wong
*Assistant Examiner* — Anibal Rivera
(74) *Attorney, Agent, or Firm* — Scully, Scott, Murphy & Presser, P.C.; Daniel P. Morris, Esq.

(57) ABSTRACT

A profiling tool identifies a code region with a false sharing potential. A static analysis tool classifies variables and arrays in the identified code region. A mapping detection library correlates memory access instructions in the identified code region with variables and arrays in the identified code region while a processor is running the identified code region. The mapping detection library identifies one or more instructions at risk, in the identified code region, which are subject to an analysis by a false sharing detection library. A false sharing detection library performs a run-time analysis of the one or more instructions at risk while the processor is re-running the identified code region. The false sharing detection library determines, based on the performed run-time analysis, whether two different portions of the cache memory line are accessed by the generated binary code.

9 Claims, 3 Drawing Sheets

(56) References Cited

U.S. PATENT DOCUMENTS

| | | | |
|---|---|---|---|
| 8,181,168 B1* | 5/2012 | Lee et al. | 717/149 |
| 8,250,555 B1* | 8/2012 | Lee et al. | 717/159 |
| 8,250,556 B1* | 8/2012 | Lee et al. | 717/159 |
| 8,291,400 B1* | 10/2012 | Lee et al. | 717/161 |
| 2007/0226723 A1 | 9/2007 | Eichenberger et al. | |
| 2008/0244533 A1* | 10/2008 | Berg et al. | 717/128 |
| 2009/0150875 A1* | 6/2009 | Maier et al. | 717/158 |
| 2011/0202907 A1* | 8/2011 | Dice et al. | 717/148 |
| 2011/0219208 A1* | 9/2011 | Asaad et al. | 712/12 |
| 2011/0283152 A1* | 11/2011 | Citron et al. | 714/45 |
| 2011/0302561 A1 | 12/2011 | Dayan et al. | |
| 2012/0278793 A1* | 11/2012 | Jalan et al. | 717/158 |

OTHER PUBLICATIONS

Tongping Liu et al., Sheriff: Precise Detection and Automatic Mitigation of False Sharing, Oct. 2011, [Retrieved on Jan. 14, 2014]. Retrieved from the internet: <URL: http://dl.acm.org/citation.cfm?id=2048070> 15 Pages (3-18).*

Matthew J. Zekauskas et al., Software write detection for distributed shared memory, 1994, [Retrieved on Jan. 14, 2014]. Retrieved from the internet: <URL: http://dl.acm.org/citation.cfm?id=1267646> 14 Pages (1-14).*

IBM; "A Method and System for Runtime Program Error Detection by Using Disposable Instrumentation"; http://www.ip.com/pubview/IPCOM000180274D; Mar. 6, 2009.

IBM; "Identifying potentially expensive paths not taken in a runtime analysis call graph"; http://www.ip.com/pubview/IPCOM000180338D; Mar. 6, 2009.

Zekauskas, MJ.-et al.; "Software write detection for a distributed shared memory"; Proceedings of the First USENIX Symposium on Operating Systems Design and Implementation(OSDI); pp. 87-100; USENIX Assoc, Berkeley, CA.; 1994.

Bernat, A. R., et al., "Anywhere, Any-Time Binary Instrumentation", PASTE '11 Proceedings of the 10th ACM SIGLAN-SIGSOFT workshop on Program analysis for software tools, Sep. 2011, pp. 9-16.

Graham, S. L., et al., "gprof: a Call Graph Execution Profiler", Proceeding of SIGPLAN'82 Symposium on Compiler Construction, Jun. 1982.

* cited by examiner

METHODOLOGY FOR FAST DETECTION OF FALSE SHARING IN THREADED SCIENTIFIC CODES

GOVERNMENT CONTRACT

This invention was Government support under Contract No. B554331 awarded by Department of Energy. The Government has certain rights in this invention.

BACKGROUND

This disclosure relates generally to a false sharing occurring in parallel computing systems, and particularly to a method for detecting the false sharing through a run-time analysis of a source code.

BACKGROUND OF THE INVENTION

A multi-threaded computing system utilizes cache memory devices by rewarding temporal and spatial locality within cache lines. However, an occurrence of false sharing degrades performance of the parallel computing system, e.g., by invoking a known cache memory coherence mechanism. False sharing occurs among threads when data that those threads access happen to be placed in the same cache line. False sharing causes "ping-pong" of invalidation to a same cache line from one thread writing to part of that cache line while the other thread accesses other parts of that cache line.

A known false sharing method relies on a compiler analysis and special hardware counters that track cache coherence traffic on processors. The drawback of this method is that special hardware counters are needed, and this method cannot distinguish between true sharing (i.e., two different threads modify a same portion of a same cache line) and false sharing (i.e., two different threads modify two different portions of a same cache line). Another known false sharing detection approach involves OS (Operating System) kernel programming. This method intercepts system calls, replaces each thread as a process, and maintains a transaction when these processes update a shared memory. The drawback of this approach includes that an application cannot afford to create many processes, e.g., more than 1 million processes, and system software on compute nodes may not allow an implementation of a transaction.

SUMMARY

There is provided a method for detecting a false sharing of a cache memory line in a multi-threaded computing environment. A compiler receives source code of a program written in a high-level programming language. The compiler compiles the received source code of the program in order to generate binary code of the program. A profiling tool identifies a code region, in the generated binary code, with a false sharing potential. A static analysis tool classifies variables and arrays in the identified code region. A mapping detection library is injected into the generated binary code in order to monitor every memory access instructions in the identified code region while a processor is running the identified code region. The mapping detection library identifies memory addresses accessed by the memory access instructions at runtime. Based on these identified memory addresses and the classification performed in the static analysis tool, one or more instructions at risk associated with one class of the classified variable and arrays are identified. Only these instructions at risk are analyzed by a false sharing detection library while the processor is re-running the identified code region. The false sharing detection library determines, based on the analysis of the one or more instructions at risk, whether two different portions of the cache memory line are accessed by the generated binary code. The false sharing detection library detects a false sharing of the cache memory line if the two different portions of the cache memory line are accessed by the generated binary code.

In order to classify the variables and arrays in the identified code region, the static analysis tool performs a static analysis on the received source code of the program. The static analysis tool defines a condition that the false sharing does not occur, based on an array size and index of an array in the received source code of the program.

The static analysis performed by the static analysis tool includes: classifying variables and arrays in the received source code into a first class representing read only variables and arrays, into a second class of variables and arrays belonging to a write operation with no false sharing risk, and into a third class of variables and arrays belonging to a write operation with a false sharing risk.

The mapping detection library is configured to generate a mapping between variables and the memory access instructions in the identified code region. Based on the generated mapping, only the one or more instructions at risk are being monitored by the false sharing detection library. The false sharing detection library reports at least one false sharing associated with the one or more instructions at risk.

The present disclosure presents a software method that uses instrumentation, a static analysis, and a run-time analysis for expediting of false sharing detection. This method includes, but is not limited to: instrumenting of binary code according to a result of source code static analysis, and feeding back run-time analysis information to a false sharing detection methodology. A mapping detection library is configured to capture relationships between load/store instructions and arrays, and feed those relationships to a run-time analysis tool which detects a false sharing occurrence. This method does not rely on special hardware, nor does it require support from OS. This method is oblivious to generating deep functional call chains and generating unorganized code.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
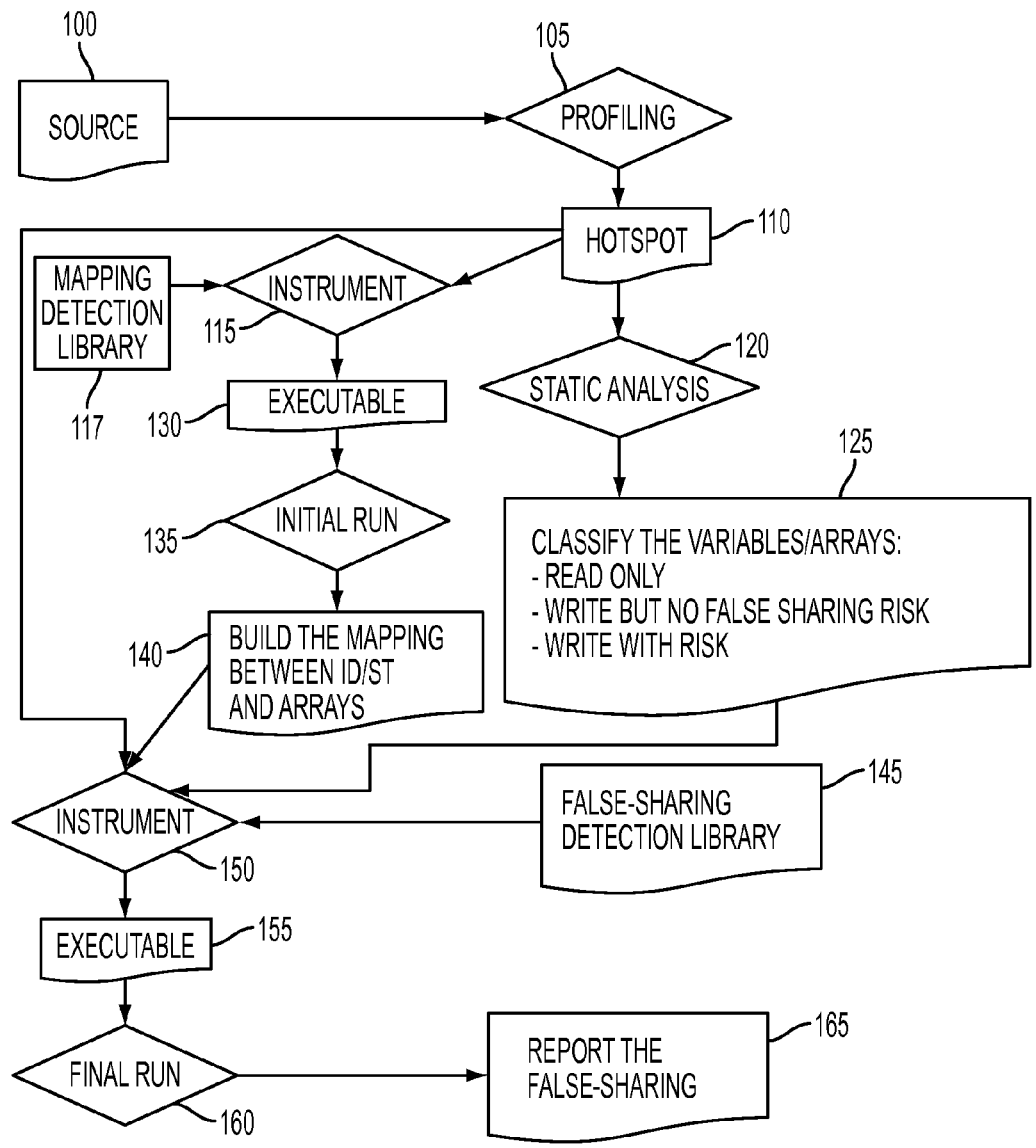
FIG. 1 illustrates a flow chart describing method steps for detecting a false sharing of a cache memory line in a multi-threaded computing environment.

FIG. 1 illustrates a flow chart describing method steps for detecting a false sharing of a cache memory line in a multi-threaded computing environment. A multi-threaded computing environment includes, but is not limited to: IBM® BlueGene®. A processor in the multi-threaded computing environment receives source code 100 of a program written in a high-level programming language, e.g., Java®, .Net, C/C++. The processor runs a compiler in order to compile the received source code. By compiling the received source code, the compiler generates original binary code of the program.

While the compiler is compiling the received source code, at step 105, a profiling tool (e.g., gprof, etc.) identifies at least one "hotspot" 110, which is at least one code region (e.g., functions, loops, etc.) in the received source code having false-sharing potentials. gprof is a profiler provided from GNU and is described in detail Susan L. Graham, et al. "gprof: a Call Graph Execution Profiler," Proceeding of the SIGPLAN '82 Symposium on Compiler Construction, June, 1982, whose contents are incorporated by reference as if set forth herein. The identification of the hopspot is done through either profiling (e.g., gprof, etc.) or collecting hardware events for "hints" of a false sharing of a cache memory line. Alternatively, a user may specify the hotspot. A code region with false-sharing potentials (i.e., hotspot) can also be identified, e.g., by collecting hardware events, for example, the number of cache coherent events. If this information, i.e., the collected hardware events, is not provided to the profiling tool, all processors in the multi-threaded computing environment may be configured to report the number of cache misses, which can be used as a hint. Alternatively, a code region taking more time than expected in the multi-threading computing environment may raise a flag indicating a potential false sharing. This identified code region (i.e., "hotspot") is provided as inputs to method steps 115-120 and 150.

At step 120, a statistic analysis tool receives source code of the identified code region and performs parsing and/or known static analysis on the source code of the identified code region. Based on this performed parsing and/or known static analysis, the static analysis tool classifies 125 variables and arrays in the identified code region into a first class representing read only variables and arrays, into a second class of variables and arrays belonging to a write operation with no false sharing risk, and into a third class of variables and arrays belonging to a write operation with a false sharing risk. The read only variables and arrays possess no possibility of false sharing unless a read only variable or array is located in a same cache line being written.

The static analysis tool defines a condition, in a form of an expression that the false sharing does not occur, based on an array size and an index of an array in the identified code region. The compiler invokes the static analysis tool on the identified code region targeting arrays that are written to. The compiler issues compiler directives, e.g., labels, to infer how a loop is partitioned, and accordingly, defines the condition in the form of an expression that a certain write to an array will not incur the false sharing. These arrays are classified as the second class of the variables and arrays. In one embodiment, this second class of the variables and arrays are not monitored during a final run at step 160, which is described in detail below.

Arrays and/or variables written to may be a source of false-sharing, but not always. Whether the false-sharing may occur depends on how many threads participate in running a loop, and how the loop is partitioned to run in parallel. For example, whether the following exemplary source code incurs a false-sharing depends on values of loop bounds.

```
parallel do i=0, s1
  do j=0, s2
    do k=0, s3
      A[i][j][k] = ...
```

In this exemplary source code, if s2 and s3 are small, e.g., number 1, an access to a[i][j][k] from different threads may be accessing to a same cache line. The static analysis tool analyzes an array access pattern, a loop partition strategy, and loop bounds, and comes up with an expression that the false sharing will not occur. In this example, the expression could be s2×s3×array element size>Cache line size. Thereby, the static analysis tool identifies which variables and arrays (and under what conditions) do not need to be watched during a run-time analysis and classifies 125 these variables and arrays as described above.

In one embodiment, at step 115, a mapping detection library 117 is injected into the binary code of the identified code region, e.g., by using an instrumenting framework. An instrumenting framework is a tool used to modify original binary code, e.g., by adding another binary code into the original binary code. Examples of the instrumenting framework includes, but is not limited to: pSigma, DYNAMO, PIN, etc. A PIN—a dynamic binary instrumentation framework—is described in detail in http://www.pintool.org/, whose entire contents are incorporated by reference as set forth herein. The instrumenting framework receives the mapping detection library 117 and binary code of the identified code region (i.e., "hotspot"), injects the mapping detection library 117 into the binary code of the identified code region, and generates a first binary code 130 that combines the mapping detection library 117 and the binary code of the identified code region.

Figure 3:
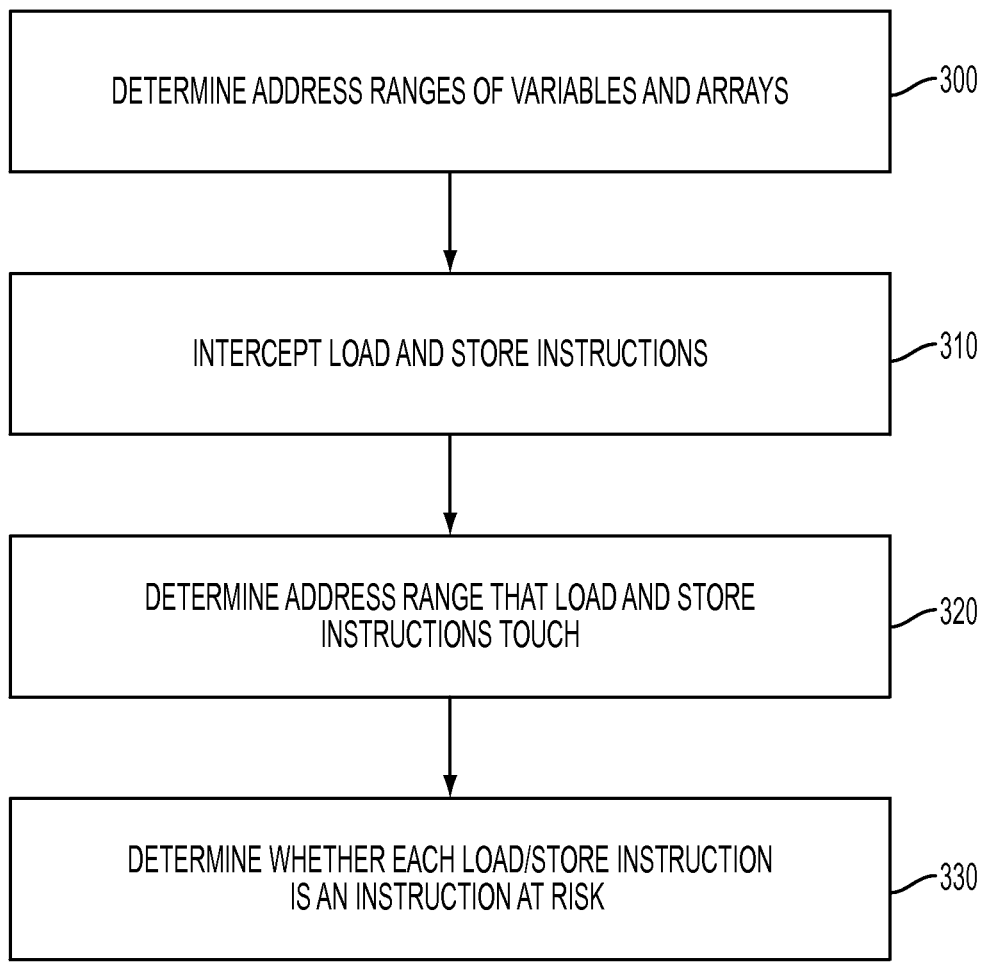
FIG. 3 illustrates a flow chart describing method steps run by a mapping detection library.

In another embodiment, a user may create the mapping detection library, e.g., by using one or more programming languages, e.g., C, C++, Java ®, .Net, based on the flow chart depicted in FIG. 3. Then, the user may compile the mapping detection library in order to generate corresponding binary code of this mapping detection library.

At step 135, by running the first binary code 130 which combines the mapping detection library 117 and the binary code of the identified code region, the processor is configured to monitor every memory access instruction (e.g., load instructions, store instructions, etc.) in the identified code region, e.g., by using the mapping detection library 117. Specifically, while the processor is running the first binary code 130, the mapping detection library 117 is configured to identify the memory addresses accessed by all load and store instructions in the identified code region, and is further configured to associate these load and store instructions identified code region with variables and arrays in the identified code region, e.g., by comparing memory address fields of the load and store instructions against memory addresses of these variables and arrays. The mapping detection library outputs that association (i.e., mapping 140 in FIG. 1).

FIG. 3 illustrates a flow chart that describes method steps run by the mapping detection library 117 in conjunction with the static analysis tool. At step 300, the static analysis tool determines memory address ranges of variables and arrays in the identified code region, e.g., based on debugging information. As described above, the static analysis tool classifies these variables and arrays, e.g., based on the characteristic of each variable and array.

At step 310, the mapping detection library 117 is configured to intercept all memory access instructions in the identified code region, e.g., load and store instructions, while the processor is running the first binary code 130. At step 320, the mapping detection library is configured to determine a memory address range that each intercepted memory access instruction touches, e.g., based on a memory address field in each memory access instruction. At step 330, the mapping detection library 117 is configured to compare the determined memory address range of each memory access instruction against memory address ranges of the third class of variables and arrays that has a false sharing risk. Binary code of the identified code region may show memory addresses of the third class of variables and arrays. If the comparison finds a match, the mapping detection library 117 is configured to classify the corresponding memory access instruction as an instruction at risk. Otherwise, i.e., if the comparison results in no match, the mapping detection library 117 is configured to filter out the corresponding memory access instruction. A filtered-out memory access instruction is no longer monitored at the final run-time analysis at 160 which is described in detail below. Thereby, the mapping detection library is configured to detect and flag a presence of the one or more instructions at risk while the processor is running the first binary code 130. The number of instructions needed to be monitored during the final run at 160 are also significantly reduced.

Returning to FIG. 1, at step 135, the mapping detection library 117 is configured to perform an initial run-time analysis: monitoring a memory access pattern of every load and store instruction in the identified code region while the processor is running the first binary code 135. During this initial run-time analysis, the mapping detection library 117 is configured to record which array or variable each load and store instruction in the identified code region touches. The initial run-time analysis may also include a run-time evaluation of arrays and variables involved in the defined false sharing condition captured in step 120. Once memory access patterns of all load and store instructions to all arrays and variables are detected and values of the variables in the defined false sharing condition are identified, the initial run-time analysis is aborted. In one embodiment, a user may eliminate a need of the initial run-time analysis, e.g., by modifying the compiler.

At step 150, the instrumenting tool receives the binary code of the identified code region 110, the mapping 140, the classifications of the variables and arrays 125, and a false sharing detection library 145. The instrumenting tool generates a second binary code 155 that combines the binary code of the identified code region 110, the mapping 140, the classifications of the variables and arrays 125, and the false sharing detection library 145. Note that during the initial run 135, the mapping detection library 117 was configured to identify the instructions at risk. The false sharing detection library is injected to the second binary code 155 in order to inspect and/or analyze only the instructions at risk determined by the mapping detection library 117 while the processor is running the second binary code 155. Tongping Lu, et al., "Precise Detection and Automatic Mitigation of False Sharing," April, 2011, describes a false sharing detection library in detail, whose entire contents are incorporated by reference as if set forth herein.

At step 160, while the processor running the second binary code 155, the false sharing detection library is configured to monitor only the instructions at risk, and is further configured to capture a stream of addresses accessed by the instructions at risk, time stamps at the moment that the instructions at risk are run, and identification numbers of threads that run the instructions at risk. Furthermore, while the processor is running the second binary code 155, the false sharing detection library 145 processes the memory address stream and detects that multiple threads may access different portion of the same cache line. While the processor is running the second binary code 155, the false sharing detection library evaluates, based on the monitored memory access patterns of the instructions at risk, whether a thread writes on a portion of a certain cache memory line and whether a different thread also writes on a different portion of that certain cache memory line. In other words, the false sharing detection library determines, based on the monitored memory access patterns, whether two different portions of a cache memory line are accessed while the processor is running the second binary code 155.

At step 160, the false sharing detection library detects, based on the monitored memory access patterns, a false sharing of a cache memory line if two different portions of that cache memory line are accessed while the processor is running the second binary code 155. In one embodiment, this detection may be performed by a simulation of running of method steps in FIG. 1. The false sharing detection library reports 165 a specific source code line(s) that causes a false sharing of a cache memory line. In one embodiment, therefore, based on one or two instrumenting of the identified code region, the false sharing detection library can identify a specific source code line(s) that causes a false sharing of a cache memory line. Upon receiving the report 165 of the false sharing, a user may update or rewrite the identified specific source code lines in order to prevent the occurrence of the false sharing. Then, the user may re-run method steps in FIG. 1 with the updated or re-written source code.

Running of method steps in FIG. 1 does not require additional hardware. In other words, by performing method steps in FIG. 1 during running the generate original binary code, the false sharing detection library can detect a false sharing without a need for additional hardware for detecting of the false sharing. Since the mapping detection library can successfully prune out the instructions that are not at risk, the number of variables to be monitored is reduced when compared to known false sharing systems. The number of instructions to be monitored is also reduced when compared to known false sharing systems. By reducing the number of instructions and variables to be monitored, the processor can detect a false sharing of a cache memory line faster than known false sharing detection systems. Method steps in FIG. 1 can be run with any commercially available processor and thus independent on processor designs or architectures.

Figure 2:
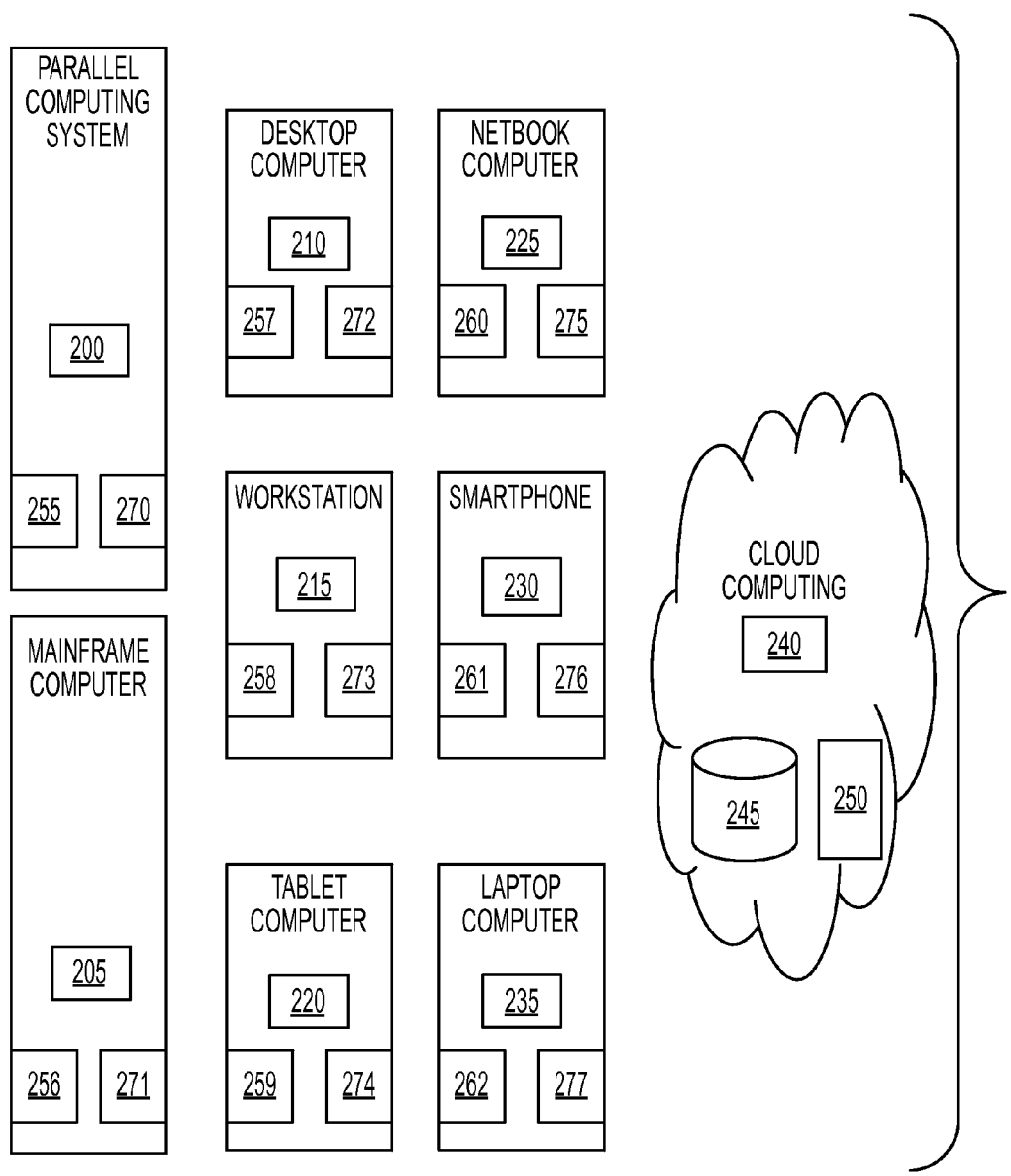
FIG. 2 illustrates an exemplary hardware configuration for running the method steps in FIG. 1.

In one embodiment, as shown in FIG. 2, method steps described in FIG. 1 can be implemented by a computing system, e.g., a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 256 and at least one memory device 974, a netbook computer 225 including at least one processor 260 and at least one memory device 275, a smartphone 230 including at least one processor 261 and at least one memory device 276, a laptop computer 235 including at least one processor 262 and at least one memory device 277, or cloud computing system 240 including at least one storage device 245 and at least one server device 250.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting a false sharing of a cache memory line in a multi-threaded computing environment, the method comprising:
    receiving, at a compiler, source code of a program written in a high-level programming language;
    generating, by the compiler, binary code of the received source code;
    identifying a code region, in the generated binary code, with a false sharing potential;
    classifying variables and arrays in the identified code region;
    monitoring all memory access instructions in the identified code region while a processor is running the identified code region;
    identifying memory addresses accessed by the memory access instructions in the identified code region while the processor is running the identified code region;
    identifying, based on the identified memory addresses and the classifying, one or more instructions at risk in the identified code region, the one or more instructions at risk associated with one class of the classified variables and arrays;
    aborting the running of the identified code region upon the one or more instructions at risk are identified;
    configuring the processor to re-run the identified code region;
    analyzing only the one or more instructions at risk in the identified code region while the processor is re-running the identified code region;
    determining, based on the analysis of the one or more instructions at risk, whether two different portions of the cache memory line are accessed by the generated binary code; and
    indicating a false sharing of the cache memory line if the two different portions of the cache memory line are accessed by the generated binary code.

2. The method according to claim 1, wherein the classifying include steps of:
invoking a static analysis on the received source code of the program; and
defining a condition that the false sharing does not occur, based on an array size and index of an array in the received source code of the program.

3. The method according to claim 2, wherein the step of invoking the static analysis includes a step of:
classifying variables and arrays in the received source code into a first class representing read only variables and arrays, into a second class of variables and arrays belonging to a write operation with no false sharing risk, and into a third class of variables and arrays belonging to a write operation with a false sharing risk.

4. The method according to claim 3, wherein the step of analyzing includes steps of:
generating a mapping between variables and the memory access instructions in the identified code region;
detecting and flagging a presence of the one or more instructions at risk; and
reporting at least one false sharing associated with the at least one instruction at risk.

5. The method according to claim 1, wherein the determining whether the two different portions of the cache memory line are accessed by the generated binary code:
detecting that multiple threads run the one or more instructions at risk;
detecting a thread modifying a portion of the cache memory line;
detecting another thread modifying a different portion of the same cache memory line.

6. The method according to claim 1, whereby a number of variables to be monitored is reduced, and a number of instructions to be monitored are reduced.

7. The method according to claim 1, whereby a need for additional hardware to detect the false sharing is obviated.

8. The method according to claim 1, wherein the identifying the code region with the false sharing potential includes running one or more steps of:
performing a profiling on the received source code; and
collecting hardware events occurred during running the received source code.

9. The method according to claim 8, wherein the hardware events are cache coherent events.

* * * * *